W. C. GRANT.
HEADING MACHINE.
APPLICATION FILED SEPT. 9, 1910.

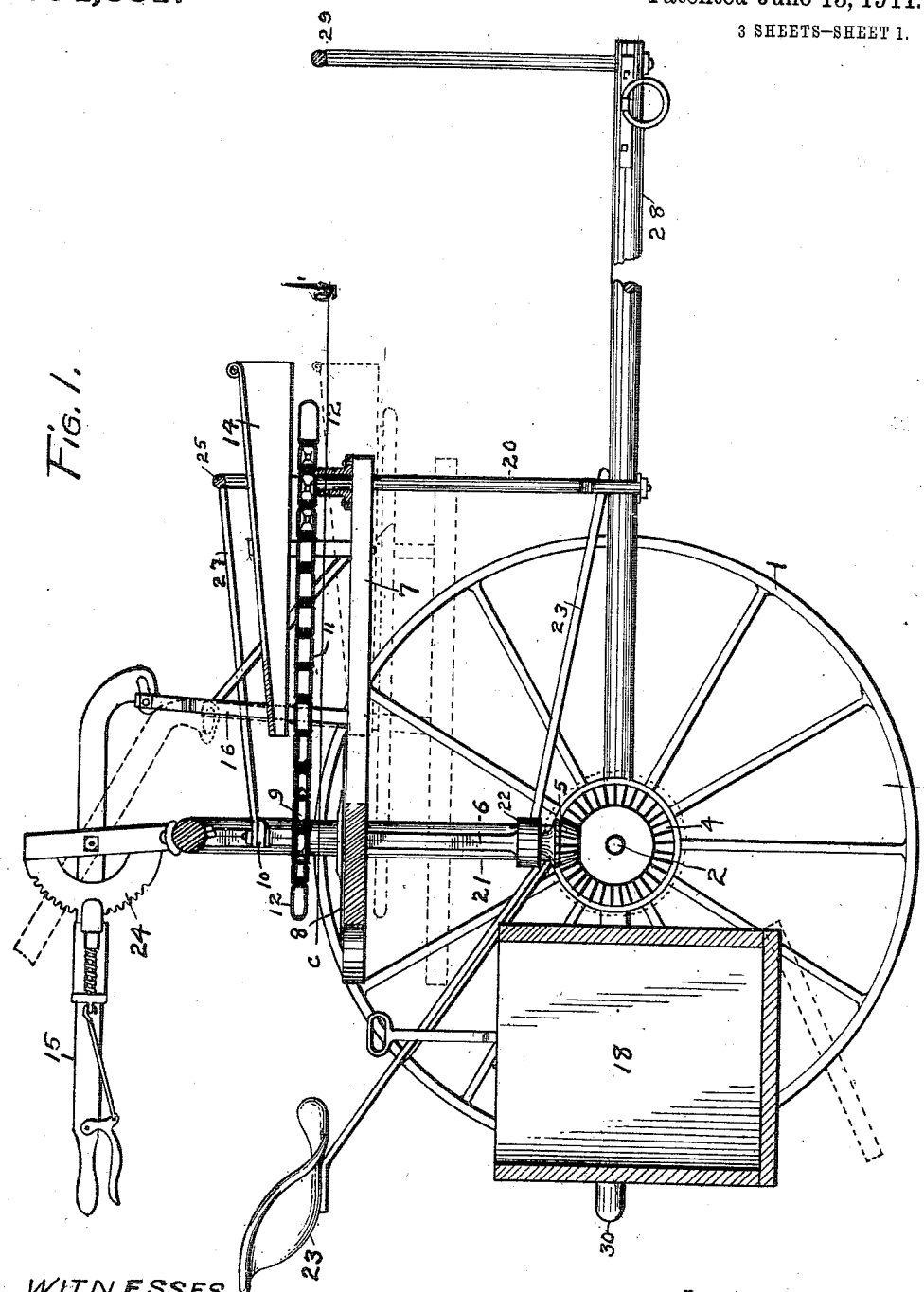

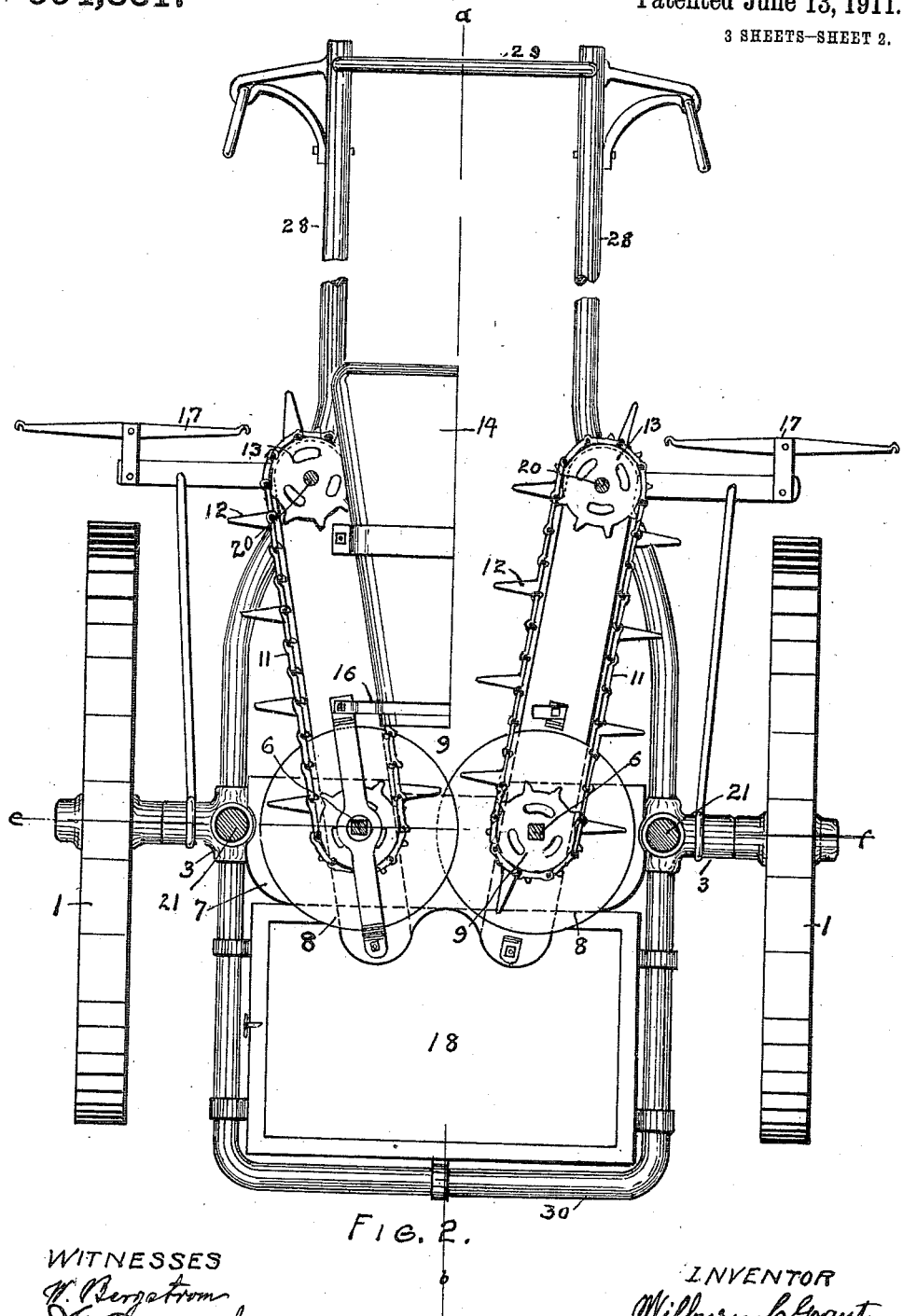

994,831.

Patented June 13, 1911.

3 SHEETS—SHEET 3.

WITNESSES

INVENTOR.
Wilburn C Grant
By Eugene D Bogory
attorney

UNITED STATES PATENT OFFICE.

WILBURN C. GRANT, OF ABILENE, TEXAS.

HEADING-MACHINE.

994,831. Specification of Letters Patent. Patented June 13, 1911.

Application filed September 9, 1910. Serial No. 581,195.

*To all whom it may concern:*

Be it known that I, WILBURN C. GRANT, a citizen of the United States, residing at Abilene, in the county of Taylor and State of Texas, have invented a new and Improved Heading-Machine, of which the following is a specification.

My invention relates to a machine for heading maize, Kafir corn and cane, and is a machine adapted to pass through a field of said plants and cut off the heads of same and pass them to a box, or other receptacle attached to the rear of the machine.

The invention consists in the novel construction and combination of parts hereinafter fully described and claimed.

Reference is to be had to the accompanying drawings, forming a part of this specification in which similar characters of reference indicate corresponding parts in all figures.

Figure 4:
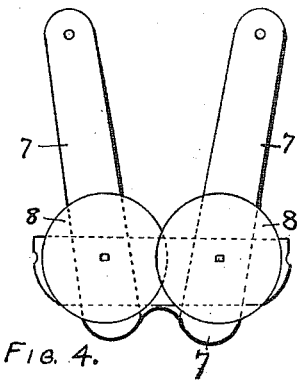
Figure 5:
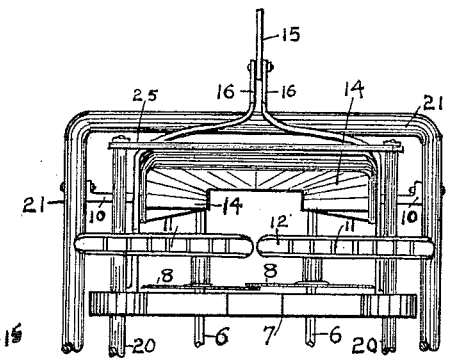
Figure 3:
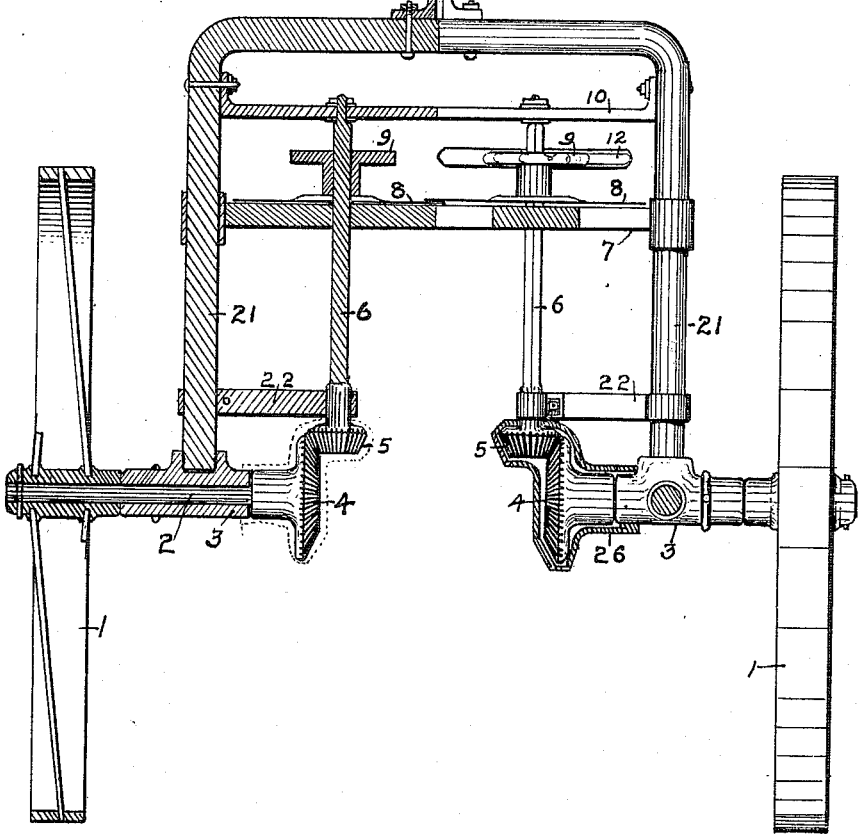

Figure 1 is a longitudinal section of the invention along the line $a, b$ in Fig. 2. Fig. 2 is a section of the invention along the line $c\ d$, Fig. 1, and also shows part of the invention in plan. Fig. 3 is a transverse section of the invention along the line $e—f$ of Fig. 2. Fig. 4 is a plan view of the rotary cutting disks and the frame upon which they are mounted. Fig. 5 is a front elevation of the upper part of the invention.

The machine is mounted upon two wheels 1, each wheel being connected with an axle 2 which passes through and is journaled in a housing 3. Said axles 2 and housings 3 are set apart a sufficient distance to permit the stalks of the plants to pass freely between same. On each axle 2 a beveled gear 4 is fixed, which drives the beveled gear 5 which is attached to the square or angular upright driving shaft 6. The driving shafts 6 pass through a movable platform or frame 7 above which the rotary cutting disks 8 and the driving sprocket wheels 9 are mounted. Said sprocket wheels 9 and cutting disks 8 have each an angular opening through which one of said shafts 6 passes, so that while said disks and sprockets rotate with the shaft they can move vertically thereon. The driving shafts 6 are reduced in size and made cylindrical at the upper ends and pass through part of the frame 10 in which they rotate freely. A sprocket chain 11 in which lug-links 12 are inserted, passes around each driving sprocket wheel 9 and passes around its respective sprocket wheel 13 at the front of the movable platform 7. Said sprockets 13 rotate upon frame rod 20 and are carried up or down with said platform. Directly over the movable platform or frame 7 and upon the same is mounted a hood 14. Said hood is larger at the front end thereof than at the rear, both as to horizontal and vertical dimensions thus forming a rearwardly tapering passage way. The entire platform or frame 7 together with the rotary cutting disks 8 with the driving sprocket wheels 9 and front sprocket wheels 13, and hood 14 is moved vertically by a lever 15 which is connected to the frame by iron straps 16.

In the use of the machine it is drawn through the field of maize, Kafir corn or cane, so as to straddle the row, the team being hitched to the swingle-trees 17. An operator resting on the seat 23 may by operating the lever 15, raise or lower the platform 7 to the desired elevation, the ratchet-sector 24 holding the lever 15 and the platform 7 in the desired position. As the machine advances forward the lugs 12 on the sprocket chains 11 engage the heads of the maize, corn or cane and pass them back over the cutting disks 8 and into a box 18. The platform 7 is adjusted to the height of the maize, corn or cane by the lever 15. The hood bends down the high heads of maize, corn or cane until brought in contact with the lugs 12 which force them back over the disk cutters 8 and into the box 18. A suitable bottom is provided for said box which the operator may drop, thereby depositing the accumulation therein upon the ground.

The platform 7 is provided at its front portion with a rearwardly-tapering recess, that in connection with the sprocket-chains 11 and hood 14 receives the stalks and heads of the maize, corn or cane and serves to throw them together and into position to be effectively engaged by the rotary cutting disks 8 and forced on by the disks 8 and the sprocket chains 11 into the box 18, where they are retained and dropped at the will of the operator.

The numeral 20 designates the front rods of the frame of the machine which holds and guides the platform 7 and sprocket wheels 13 in a vertical direction.

The numeral 21 designates the rear uprights of the frame of the machine.

The numeral 22 designates the straps to hold the driving shafts 6 in position.

Numeral 23 designates a brace rod connecting the forward uprights 20 with the rear uprights 21.

25 is a brace rod connecting the upper ends of the uprights 20 and 27 is a brace rod connecting the frame 10 with the cross rod 25.

Numeral 26 designates incasements or shields to prevent obstructions from coming into contact with gears 4 and 5.

Numeral 28 designates members fixed to axle housings 3 constituting forwardly projecting parallel rods at the forward end of which an arch or yoke 29 is fixed thereby permitting the maize, Kafir corn or cane as the machine advances to pass between said members 28 and beneath yoke 29.

Numeral 30 designates a frame that surrounds box 18 supporting same.

Various changes in form, proportion and minor details of my invention may be resorted to without departing from the spirit and scope thereof. Hence, I do not consider myself limited to the precise construction herein shown, but am entitled to all the variations coming within the scope of my claims.

Having thus described my invention, I claim.—

1. A heading machine comprising a carriage consisting of two oppositely disposed wheels, a pair of shafts, an axle connected to the hub of each wheel at one end and carrying a beveled gear at the other end, bushings for said shafts between said wheels and said gears, a bowed frame supported on said bushings, a platform mounted on said frame, vertical rotating shafts supported by said frame projecting through openings in said platform, bevel pinions on one end of said vertical shafts meshing with the pinions on said axle, a cutting disk and a sprocket wheel supported upon said platform and mounted to slide upon and rotate with each of said vertical shafts above said platform, a pair of forwardly projecting horizontally arranged bars connected to said bushing, vertical rods supported upon said horizontal rods, sprocket wheels supported on said platform and mounted to slide and rotate upon said vertical rods, sprocket chains connecting said sprocket wheels with the sprocket wheels on said vertical shafts, said sprocket chains having lateral projections thereon, and means for raising and lowering said platform.

2. A heading machine comprising a two wheeled cart having separate axles for each wheel, said axles each being provided with a bevel gear, a bowed upright frame and a pair of parallel, forwardly extending bars supported by said axles, vertical shafts revolubly supported by said bowed frame, bevel gears on the ends of said shafts adapted to mesh with the gears on said axles, a platform mounted to slide upon said frame, sprocket wheels and disk cutters mounted to rotate with said shafts, uprights supported upon said forwardly extending bars, sprocket wheels rotatably and slidably mounted upon said uprights, sprocket chains connecting said sprocket wheels with the sprocket wheels on said shafts, and means for simultaneously raising and lowering said platform and said cutter disks and said sprocket wheels.

WILBURN C. GRANT.

Witnesses:
W. BERGSTROM,
J. E. ARNOLD.

---

Copies of this patent may be obtained for five cents each, by addressing the "Commissioner of Patents, Washington, D. C."